(12) United States Patent
Revell

(10) Patent No.: US 8,117,760 B1
(45) Date of Patent: Feb. 21, 2012

(54) WALL MOUNTING AND ALIGNMENT DEVICE

(76) Inventor: Graeme C. Revell, Napa, CA (US)

( * ) Notice: Subject to any disclaimer, the term of this patent is extended or adjusted under 35 U.S.C. 154(b) by 0 days.

(21) Appl. No.: 12/897,038

(22) Filed: Oct. 4, 2010

(51) Int. Cl.
*B43L 7/10* (2006.01)
*G01B 3/02* (2006.01)

(52) U.S. Cl. .................... 33/458; 33/452; 33/456

(58) Field of Classification Search .......... 33/458, 33/459, 451, 452, 456, 374, 375
See application file for complete search history.

(56) References Cited

U.S. PATENT DOCUMENTS

| | | | | |
|---|---|---|---|---|
| 740,742 A * | 10/1903 | Bush | | 33/342 |
| 741,861 A * | 10/1903 | White | | 33/353 |
| 794,071 A * | 7/1905 | Barbow | | 33/284 |
| 941,492 A * | 11/1909 | Burns | | 33/341 |
| 986,001 A * | 3/1911 | Hendrickson | | 33/341 |
| 1,015,877 A * | 1/1912 | Du Mouchel | | 33/340 |
| 1,120,443 A * | 12/1914 | Buck | | 33/340 |
| 1,462,231 A * | 7/1923 | Fouse | | 403/102 |
| 1,489,239 A * | 4/1924 | Eagan | | 33/343 |
| 1,827,686 A * | 10/1931 | Gabrielson | | 33/458 |
| 1,979,567 A * | 11/1934 | Nicholson | | 33/458 |
| 2,878,569 A * | 3/1959 | Metrulis | | 33/451 |
| 3,003,244 A * | 10/1961 | Fogliano | | 33/341 |
| 3,308,543 A * | 3/1967 | O'Connor | | 33/458 |
| 4,524,527 A * | 6/1985 | Jeffrey | | 33/451 |
| 4,648,185 A * | 3/1987 | Brandimarte | | 33/669 |
| 6,047,478 A | 4/2000 | Sowers | | |
| 6,049,990 A * | 4/2000 | Holland | | 33/464 |
| 6,367,227 B1 * | 4/2002 | Veyna | | 52/747.1 |
| 6,421,928 B1 * | 7/2002 | Miller | | 33/520 |
| 6,643,942 B1 * | 11/2003 | Russell | | 33/459 |
| 6,739,065 B2 * | 5/2004 | Hofmeister et al. | | 33/613 |
| 7,111,408 B2 * | 9/2006 | Critelli et al. | | 33/458 |
| 7,210,243 B2 | 5/2007 | Schmidt et al. | | |
| 7,254,898 B1 * | 8/2007 | Armstrong | | 33/464 |
| 7,373,727 B2 * | 5/2008 | Bruce | | 33/455 |
| 2001/0013176 A1 * | 8/2001 | Ruther | | 33/451 |
| 2002/0078583 A1 | 6/2002 | Richardson | | |
| 2007/0227022 A1 * | 10/2007 | Bruce | | 33/455 |
| 2010/0229411 A1 * | 9/2010 | Lai | | 33/458 |

* cited by examiner

*Primary Examiner* — Yaritza Guadalupe-McCall
(74) *Attorney, Agent, or Firm* — Dale J. Ream

(57) ABSTRACT

A device for preparing to mount a wall fixture includes a main base having opposed first and second ends and a first auxiliary base having a substantially similar configuration. The first auxiliary base is coupled to the main base and movable between a closed configuration in which the first auxiliary base is positioned substantially atop the main base and an open configuration in which the first auxiliary base is linearly adjacent the main base. The main base and first auxiliary base each define a slot extending longitudinally between respective first and second ends. Each base includes a marking member situated in a respective base slot and slidably movable therealong. Each base includes a respective locking assembly for securing a respective marking member at a desired position along a respective slot. Each marking member includes a pointed distal end for making a starter hole when depressed against a wall surface.

20 Claims, 12 Drawing Sheets

US 8,117,760 B1

WALL MOUNTING AND ALIGNMENT DEVICE

BACKGROUND OF THE INVENTION

This invention relates generally to wall hanging and mounting devices and, more particularly, to a wall mounting and alignment device that enables a user to prepare a wall surface for mounting a wall fixture, such as a picture frame or shelf, in a level manner without measuring and without using multiple tools.

Mounting a picture frame or shelf on a wall is often a frustrating time-consuming chore, mainly because it may require multiple tools and multiple steps. For example, a user may measure a distance between two or more mounting holes on the back of a frame, drill multiple holes or scribe pencil marks upon a wall surface, and then insert fasteners such as nails or screws at respective positions on the wall surface on which the frame may be hung. Unfortunately, mounting a picture frame may turn out to be a trial and error process as a person may try to "guess" the distance between two or more pre-set mounting holes, insert fasteners into the wall, try to hang the frame on the fasteners, and then have to re-adjust everything if the fasteners are not correctly placed. Even if the fasteners have been correctly spaced apart, they may not be perfectly level, resulting in the picture frame leaning one way or the other.

As is apparent from the description above, a person may need a measuring device in order to correctly measure a distance between mounting holes on a structure to be mounted, a pencil to mark locations on a wall surface corresponding to the distance between mounting holes, and a bubble level to verify that the mounting holes are horizontally level. Although assumably effective for their intended purposes, the existing devices for mounting a wall fixture such as a picture frame or shelf are inconvenient and difficult to utilize together to quickly and accurately mount a wall fixture.

Therefore, it would be desirable to have a wall mounting and alignment device that enables a user to impress markings into a wall surface into which fasteners may be inserted without having to first inscribe pencil markings. Further, it would be desirable to have a wall mounting and alignment device which can span a distance corresponding to wall fixture mounting holes without having to measure that space and without having to hold the object up against the wall surface. In fact, the template may be formed while the object to be hung remains face down. In addition, it would be desirable to have a wall mounting and alignment device that provides an instant visual indication of whether the device is horizontally level.

SUMMARY OF THE INVENTION

A device for preparing a wall surface for mounting a wall fixture thereon includes a main base having opposed first and second ends and a first auxiliary base having a substantially similar configuration. The first auxiliary base is coupled to the main base and movable between a closed configuration in which the first auxiliary base is positioned substantially atop the main base and an open configuration in which the first auxiliary base is linearly adjacent the main base. The main base and first auxiliary base each define a slot extending longitudinally between respective first and second ends. Each base includes a marking member situated in a respective base slot and slidably movable therealong. Each base also includes a respective locking assembly for securing a respective marking member at a desired position along a respective slot. Each marking member includes a pointed distal end for making a starter hole or depression when depressed against a wall surface.

Therefore, a general object of this invention is to provide a wall mounting and alignment device that enables a user to prepare a wall surface for insertion of fasteners for hanging a wall fixture that does not require use of a traditional measuring tool, scribing instrument, or carpenter's level.

Another object of this invention is to provide a wall mounting and alignment device, as aforesaid, that causes depressions to be made in the wall surface indicating where to insert fasteners.

Still another object of this invention is to provide a wall mounting and alignment device, as aforesaid, that is movable between compact and extended configurations.

Yet another object of this invention is to provide a wall mounting and alignment device, as aforesaid, in which awl members are slidably adjustable and securable.

A further object of this invention is to provide a wall mounting and alignment device, as aforesaid, that indicates if fastener depression markings are level.

A still further object of this invention is to provide a wall mounting and alignment device, as aforesaid, that is easy to use and cost-effective to manufacture.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4a is a side view of the device as in FIG. 1a;

FIG. 6 is an isolated view on an enlarged scale of a portion of the device taken from FIG. 5a;

FIG. 10a is a side view of the device as in FIG. 7a;

FIG. 11 is an end view of the device as in FIG. 7a;

DESCRIPTION OF THE PREFERRED EMBODIMENT

Figure 1:
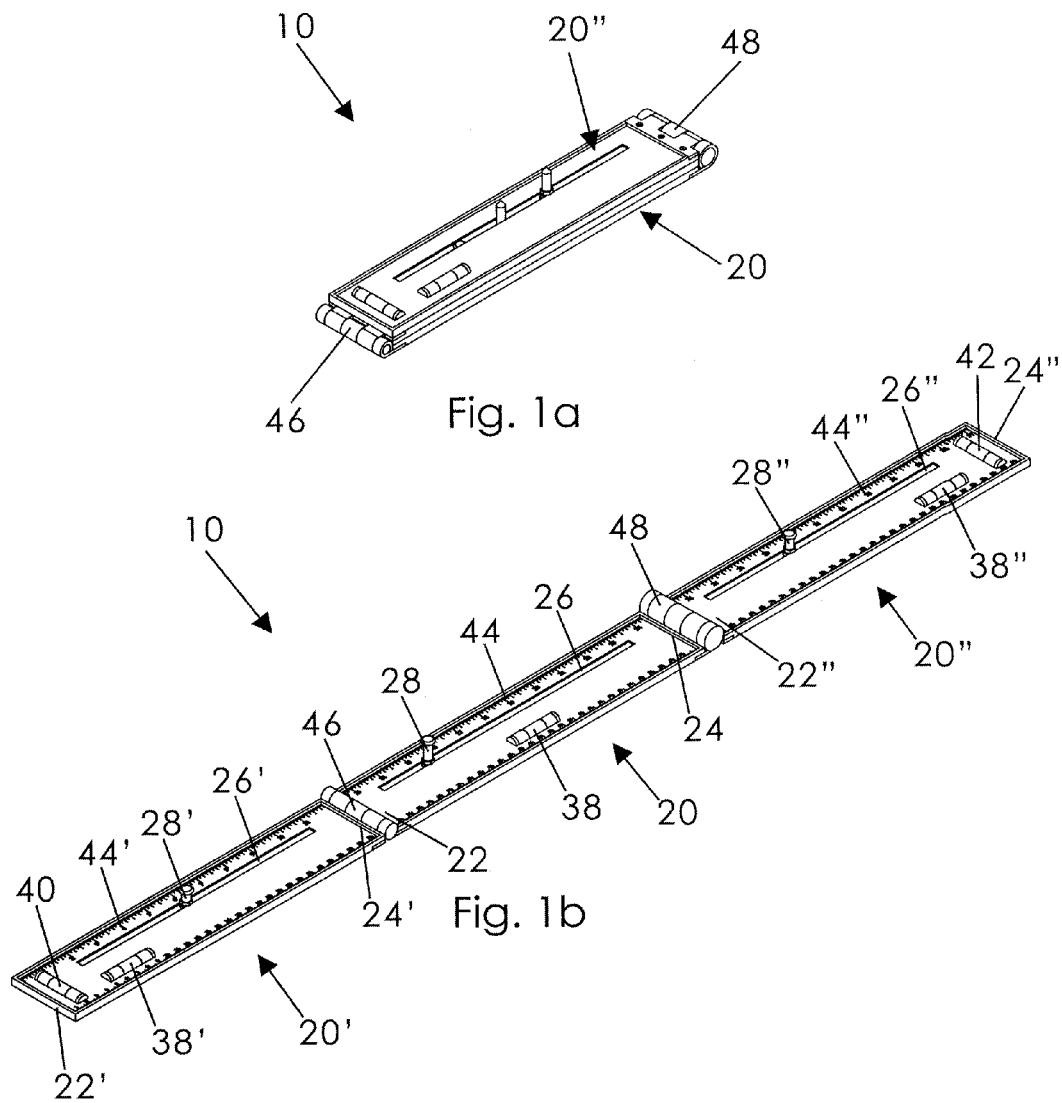
FIG. 1a is a perspective view of a wall mounting and alignment device according to one embodiment of the present invention shown in a closed configuration.
FIG. 1b is a perspective view of the device as in FIG. 1b shown in an extended configuration.
Figure 2:
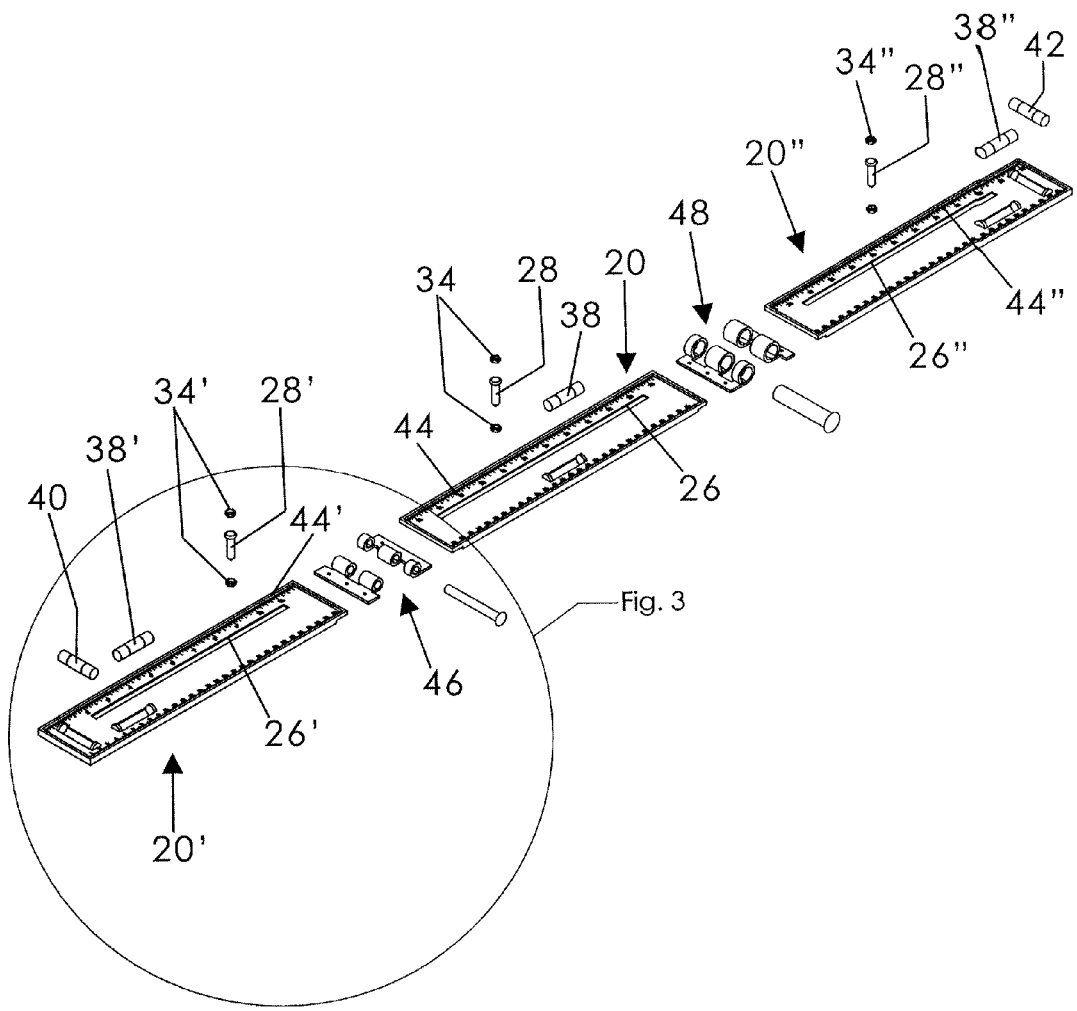
FIG. 2 is an exploded view of the device as in FIG. 1b.
Figure 3:
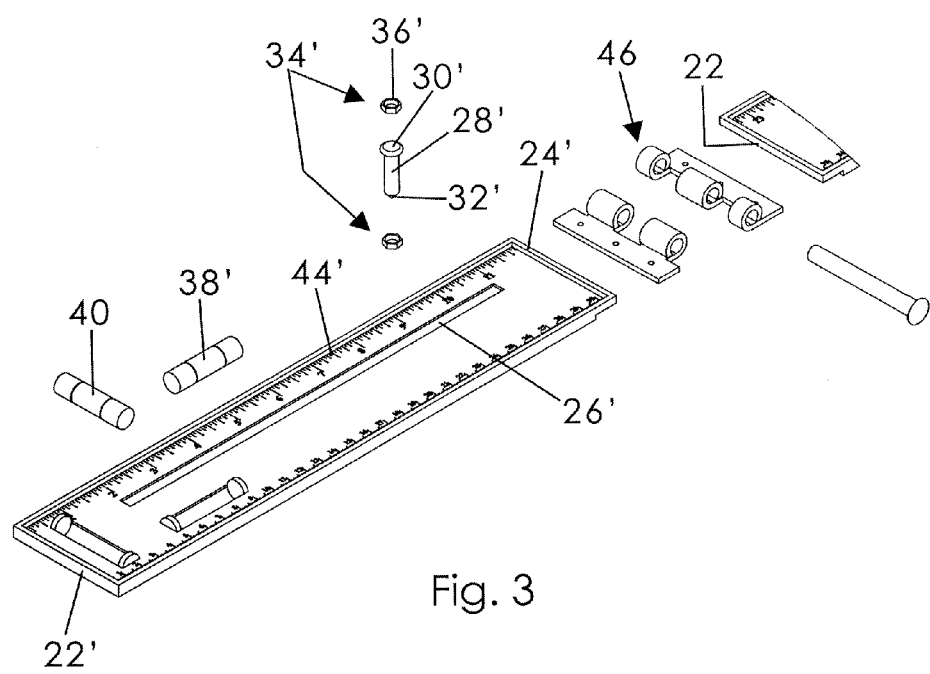
FIG. 3 is an isolated view on an enlarged scale of a portion of the device taken from FIG. 2.
Figure 4A:
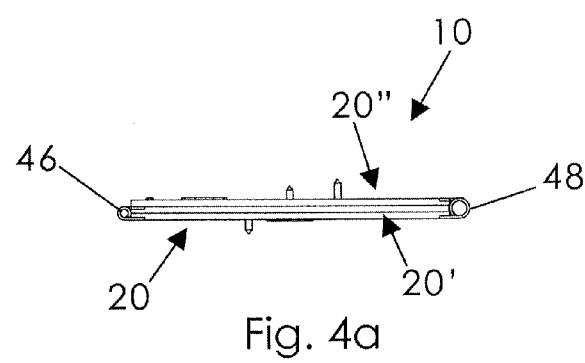
Figure 4B:
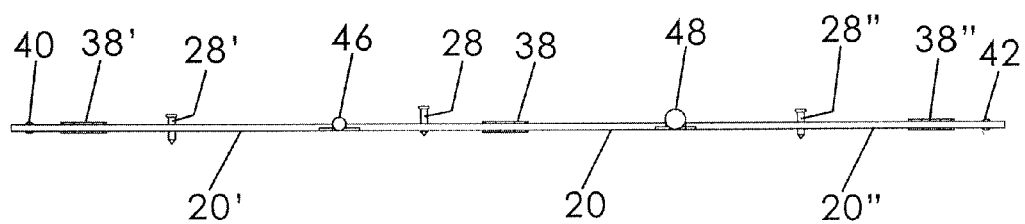
FIG. 4b is a side view of the device as in FIG. 1b.
Figure 5:
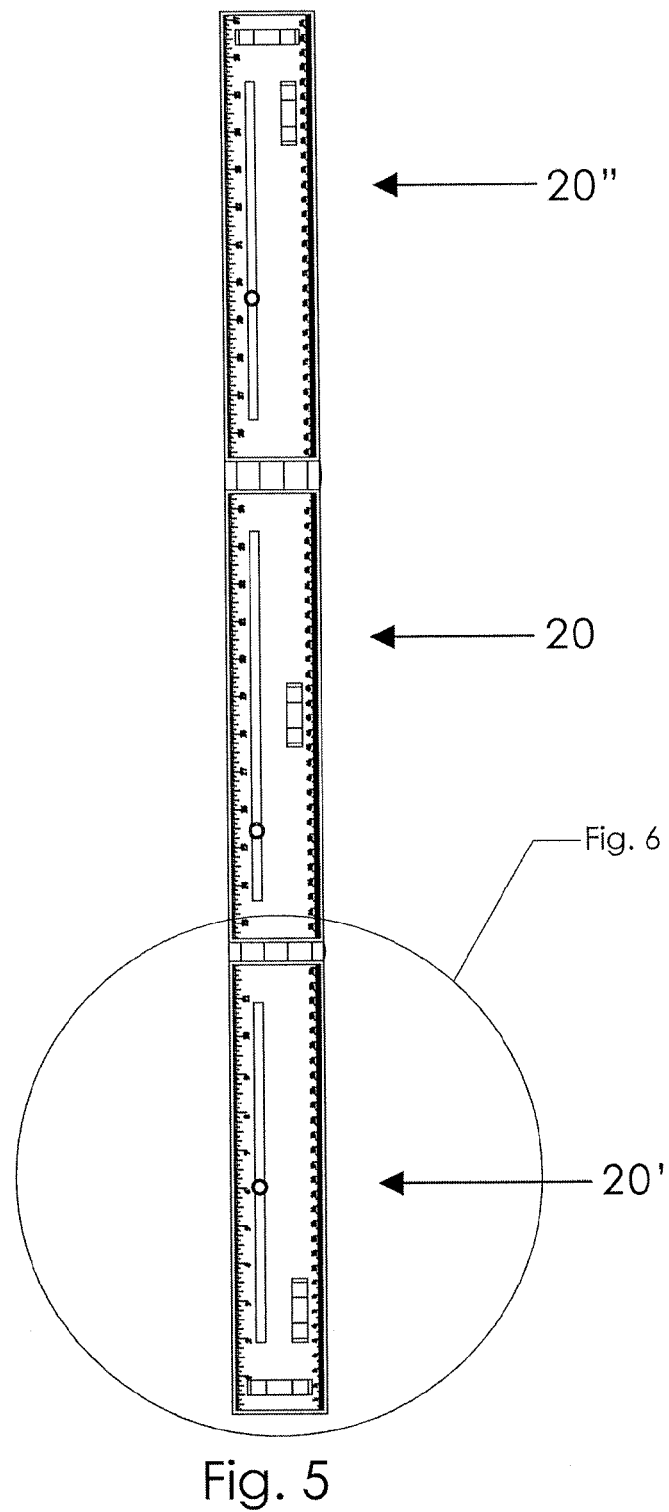
FIG. 5 is a top view of the device as in FIG. 1b.
Figure 6:
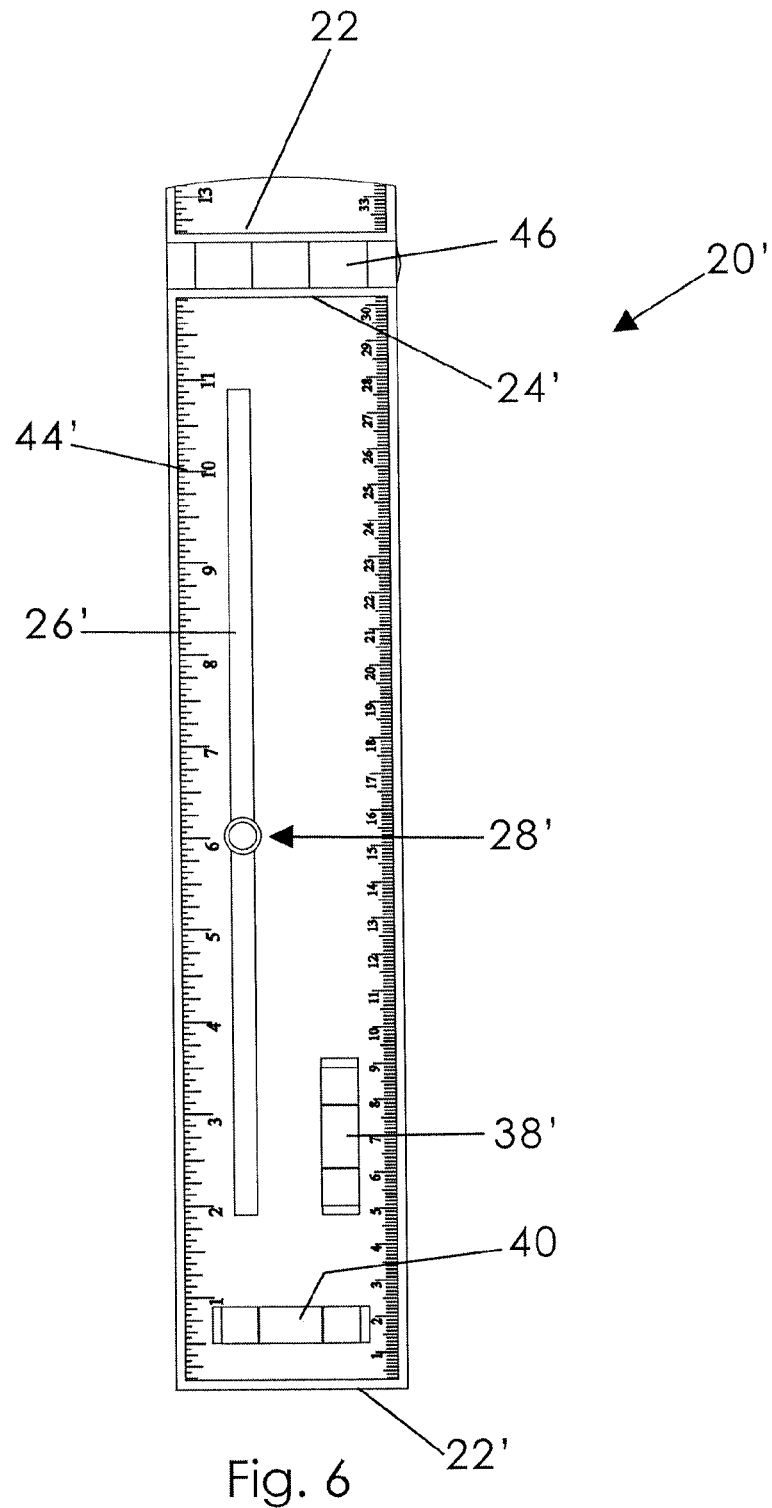
Figure 7A:
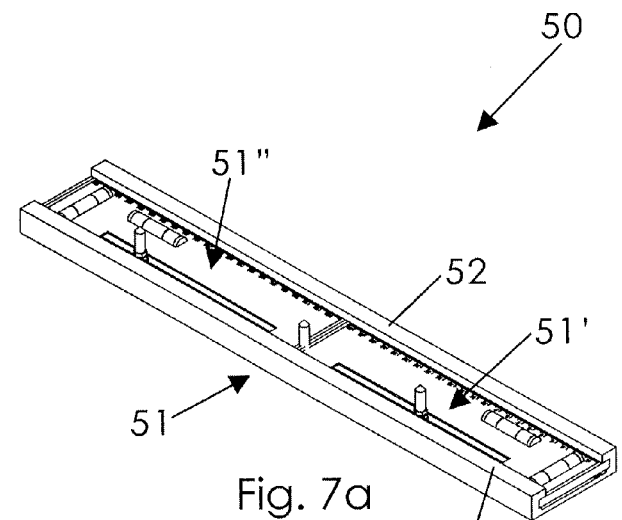
FIG. 7a is a perspective view of a wall mounting and alignment device according to another embodiment of the present invention shown in a closed configuration.
Figure 7B:
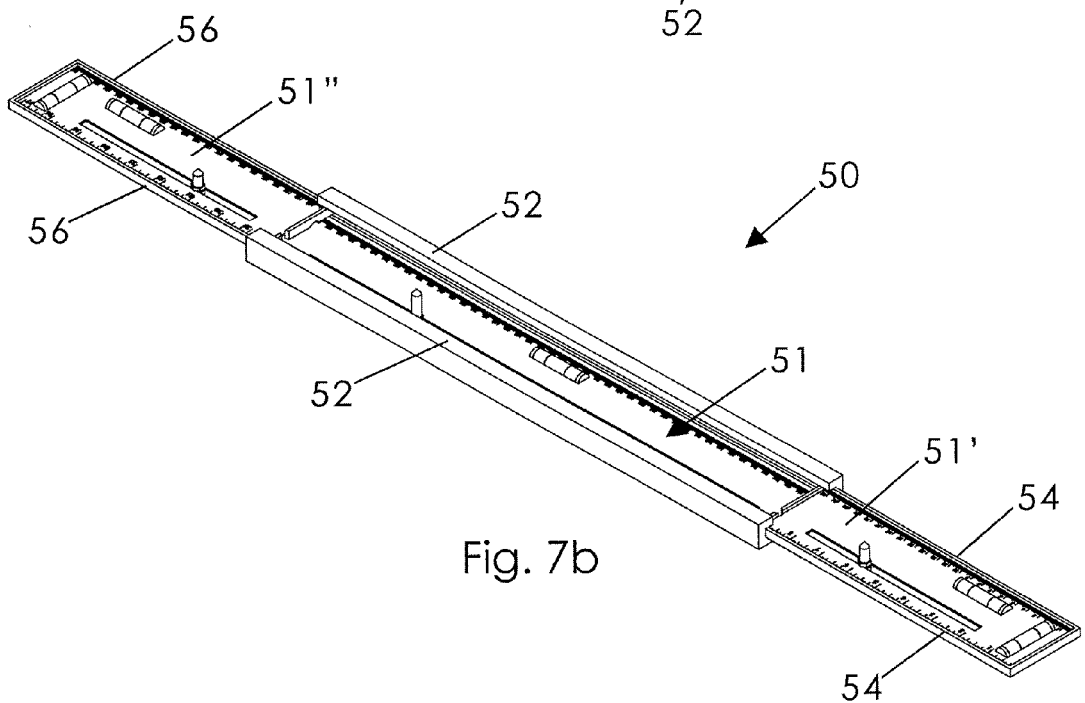
FIG. 7b is a perspective view of the device as in FIG. 7b shown in an extended configuration.
Figure 8:
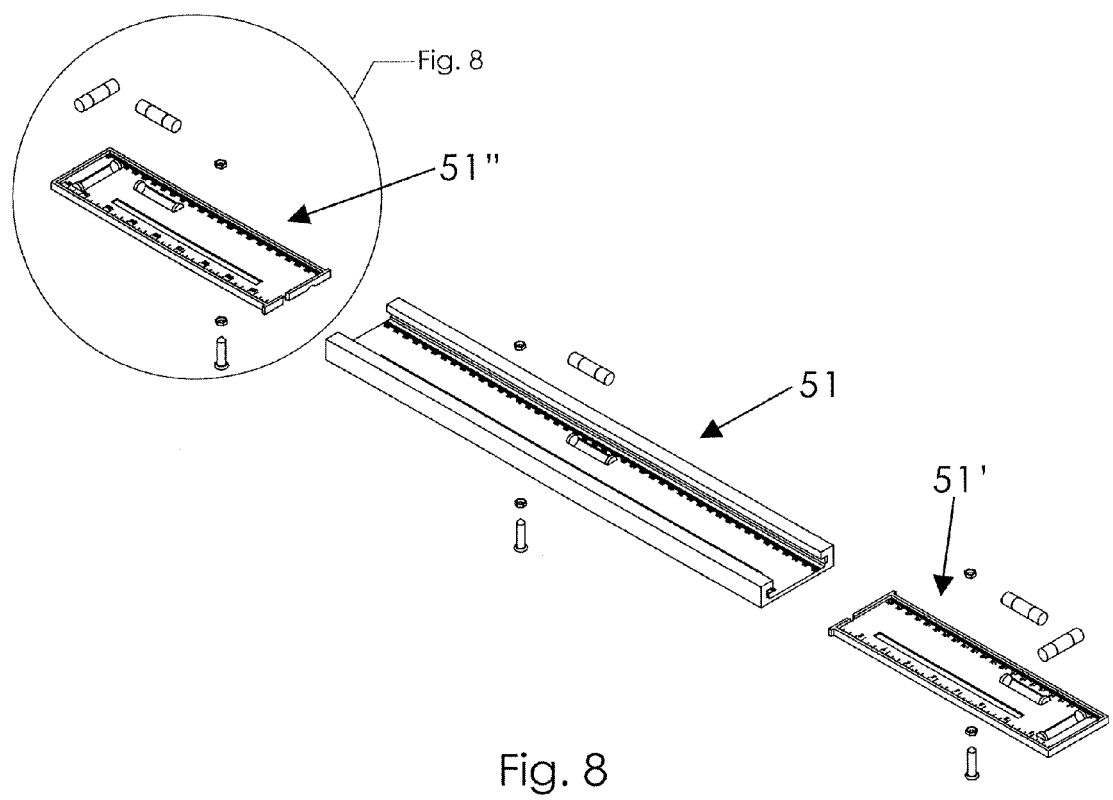
FIG. 8 is an exploded view of the device as in FIG. 7b.
Figure 9:
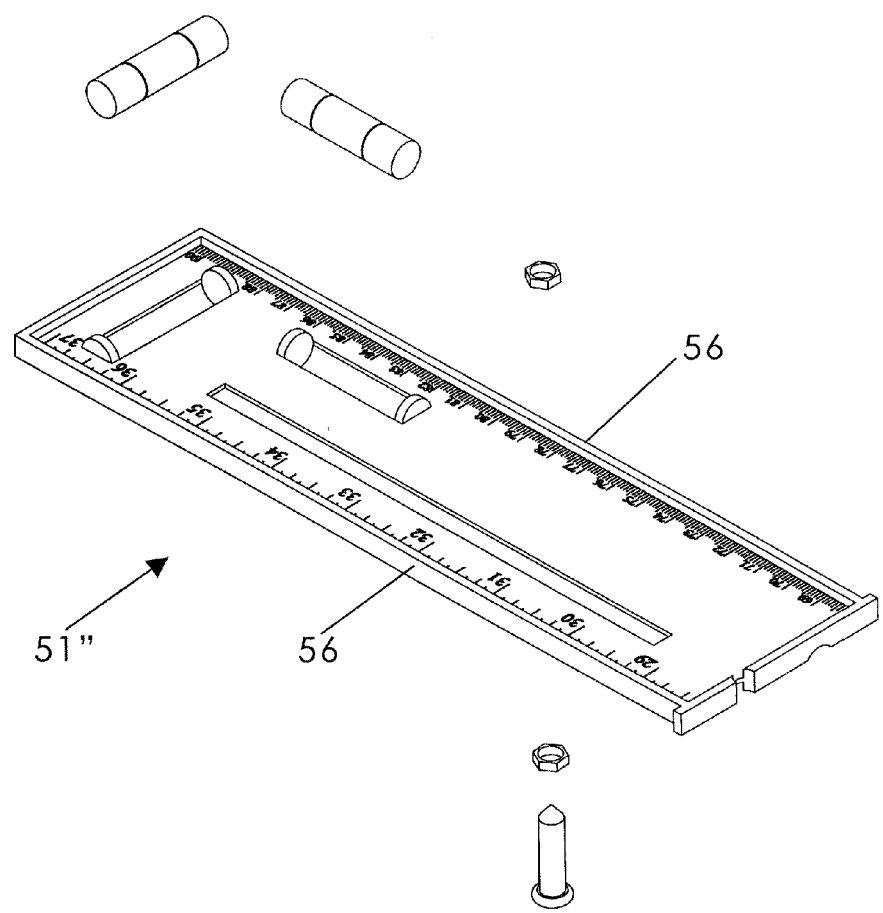
FIG. 9 is an isolated view on an enlarged scale of a portion of the device taken from FIG. 8.
Figure 10A:
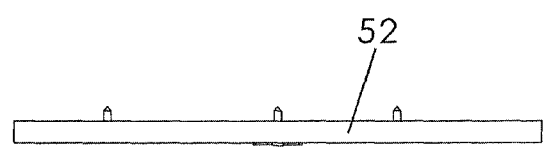
Figure 10B:
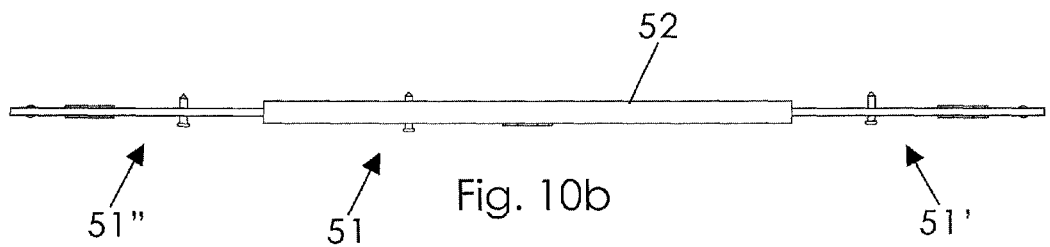
FIG. 10b is a side view of the device as in FIG. 7b.

A wall mounting and alignment device according to a preferred embodiment of the present invention will now be described with reference to FIGS. 1a to 12b of the accompanying drawings. The wall mounting and alignment device 10 includes a main base 20, a first auxiliary base 20', a main base marking member 28, and a first auxiliary base marking member 28'. In addition, the device 10 may also include a second auxiliary base 20", and second auxiliary base marking member 28" as described in more detail below. Each marking member may be slidably adjusted relative to one another so that a user may position them according to respective fastener alignment holes of a wall mountable fixture, such as a picture frame or shelf.

The main base 20 includes a substantially rigid structure constructed of plastic, aluminum, or other light metal and having a generally planar configuration. Preferably, the main base 20 includes opposed first 22 and second 24 ends and presents a rectangular configuration although other configurations may also work. In some embodiments, the main base 20 may be constructed of plastic or in higher end embodiments, a metal construction may be preferred. The main base 20 defines a linear slot 26 extending longitudinally substantially between first 22 and second 24 ends. The main base marking member 28 is situated in the main base slot 26 and is slidably movable therein either toward or away from the main base first end 22. The main base marking member 28 includes proximal 30 and distal 32 ends. Preferably, the distal end 32 includes a generally pointed or cone shaped configuration, such as that of an awl, so as to make a depression in a wall when placed against a wall surface and pressure is applied to the proximal end 30. Alternatively, the base marking member 28 may be a pencil, pen, or other scribing instrument configured to make a non-penetrating mark on the wall surface in use.

Figure 11:
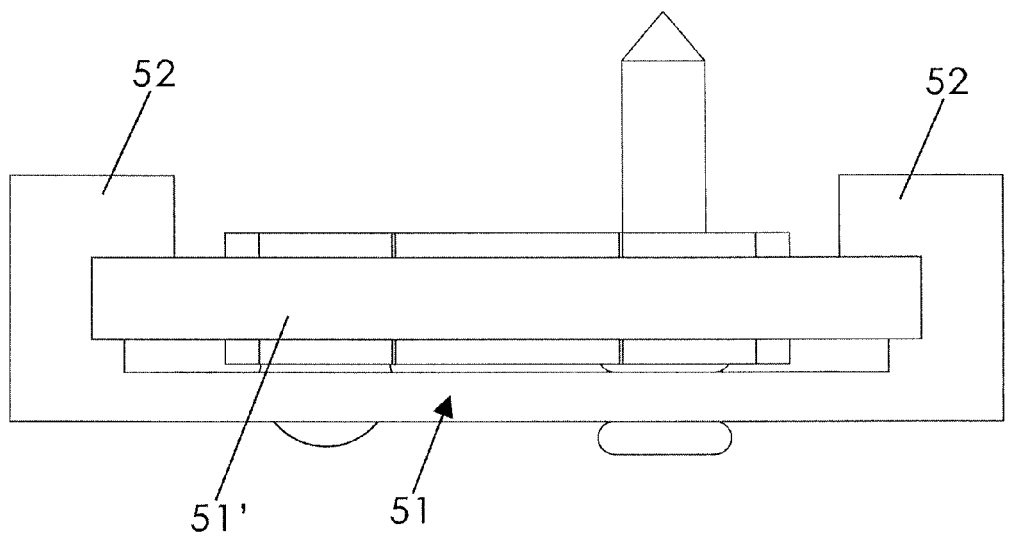
Figures 12A, 12B:
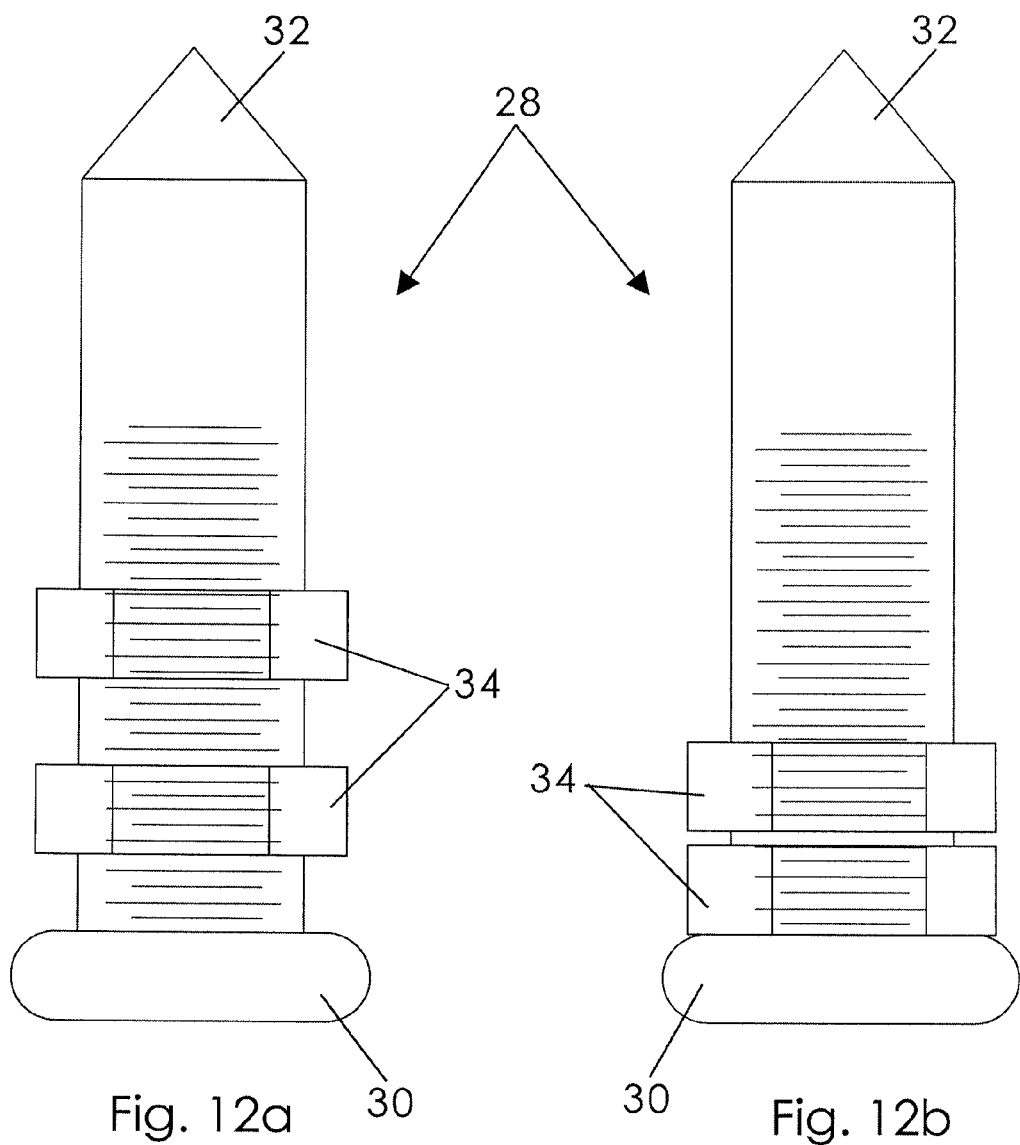
FIG. 12a is a side view of a marking member in a released configuration.
FIG. 12b is a side view of a marking member in a tightened or secured configuration.

A main base locking assembly 34 is operatively connected to the main base marking member 28 and is operatively connected to the main base marking member 28 so that the main base marking member 28 may be secured at a desired position along the main base slot 26 or released therefrom. More particularly, the main base marking member 28 includes a threaded configuration (FIGS. 12 and 12b). The main base locking assembly 34 includes at least one fastener 36, such as an interiorly threaded nut, having a size suitable to receive the main base marking member 28 therein in an increasing tightening relationship. Preferably, a threaded fastener 36 is included relative to the base marking member both above and below the main base slot 26 (FIG. 11). In other words, a main base marking member 28 may be tightened down and secured at a selected position along the main base member slot 28 (FIGS. 12a and 12b). Alternatively, the main base locking assembly may include a "push-and-click" mechanism that locks the marking member 28 at a desired position until pulled back out to release the position as would be known in the art.

The first auxiliary base 20' includes a construction substantially similar to that of the main base 20, primed reference numerals being used to designate having the same construction as those discussed above. The present invention also includes a second auxiliary base 20", double primed reference numerals being used to designate elements having the same construction as those discussed above.

The main base 20 may also include at least one bubble level 38 (FIG. 1b). Preferably, the bubble level 38 is a horizontal level so that a user may visually determine that the mounting and alignment device 10 is level before pressing respective marking members to mark a wall surface. As shown in FIG. 1b, the first 20' and second 20" auxiliary bases may also include vertical bubble levels 40, 42, respectively. Further, each base 20, 20', 20" may include a scale indicia 44, 44', 44" positioned adjacent and along a respective slot 26, 26', 26", respectively. It should be noticed that each bubble level is positioned to that it may be seen from either side of a respective base.

The first auxiliary base 20' is coupled to the first end 22 of the main base 20 and is movable between a closed configuration in which the first auxiliary base 20' is positioned substantially atop the main base 20 (FIG. 1a) and an open configuration the first auxiliary base 20' is linearly adjacent the main base 20 (FIG. 1b). The second end 24' of the first auxiliary base 20' may be pivotally coupled to the first end 22 of the main base 20 with a first hinge 46. Similarly, the first end 22" of the second auxiliary base 20" may be pivotally coupled to the second end 24 of the main base 20 with a second hinge 48 for movement between closed and open configurations. It is understood that the second hinge 48 may be larger than the first hinge 46 such that second auxiliary base 20" at its closed configuration may be positioned atop the first auxiliary base 20' when the first auxiliary base 20' is also positioned atop the main base 20 (FIG. 1a). In other words, the hinges of different sizes enable the present inventive device 10 to be configured at a compact closed configuration without interference between the auxiliary base members.

A mounting and alignment device 50 according to another embodiment is shown in FIGS. 7a to 11 and includes a construction substantially similar to the construction described above except as specifically noted below. The device 50 according to this embodiment includes a main base 51, a first auxiliary base 51', and at least a second auxiliary base 51". Embodiments having two or more auxiliary bases are contemplated as well. The main base 51 according to this embodiment includes opposed longitudinal side edges that define rails 52. Further, each of the first 51' and second 51" auxiliary bases include truncated upstanding longitudinal side edges 54, 56, respectively, having a configuration that is complementary to a configuration of respective rails 52 such that the truncated side edges 54, 56 may be received in respective rails 52 for slidable movement therealong. For example, the first auxiliary base 51' is movable between a closed configuration atop the main base 51 (FIG. 7a) and an extended configuration linearly adjacent to the main base 51 (FIG. 7b). Similarly, the second auxiliary base 51" is movable between a closed configuration atop the main base 51 (FIG. 7a) and an extended configuration linearly adjacent the main base 51.

Referring to the embodiment first described above, it is understood that each auxiliary base 20', 20" may alternatively be rotatably coupled (not shown) to the main base 20. In other words, each auxiliary base 20', 20" would be rotatably moved between open and closed configurations like the knives of a pocket knife.

In use, the mounting and alignment device 10 may be stored in its closed or retracted configuration (FIG. 1a) when not in use. In fact, it may even be packaged and shipped with picture frames, shelving fixtures, or other wall mountable items. Then, the first 20' and second 20" auxiliary bases may be moved to extended/open configurations. The bases may be positioned over mounting holes or brackets of a wall mountable fixture and the respective marking members 28, 28', 28" slidably adjusted until they match or register therewith. The scale indicia 44, 44', 44" may be utilized if it is not feasible to physically align the device 10 with the mounting holes/brackets. Then, each marking member may be tightened and secured at the desired location along each respective slot as described above. Then, the mounting and alignment device 10 may be positioned on a wall surface, adjusted to a level alignment by viewing the bubble level(s) 38, 40, 42. The user may exert pressure on each marking member and, accordingly, cause impressions to be made on the wall surface into which fasteners may be driven.

Accordingly, the mounting and alignment device 10 enables a user to quickly determine the spacing between mounting holes or mounting brackets of a wall mounted fixture, such as picture frame, and then make starter hole impressions on the wall accordingly.

It is understood that while certain forms of this invention have been illustrated and described, it is not limited thereto except insofar as such limitations are included in the following claims and allowable functional equivalents thereof.

The invention claimed is:

1. A device for preparing a wall surface for mounting a wall fixture thereon, comprising:
    a main base having opposed first and second ends and defining a generally planar configuration;
    a first auxiliary base having first and second ends and defining a generally planar configuration, said first auxiliary base being coupled to said main base and movable relative thereto between a closed configuration in which said first auxiliary base is positioned substantially atop said main base and an open configuration in which said first auxiliary base is linearly adjacent said main base;
    wherein said main base defines a linear slot extending substantially between said main base first and second ends;
    a main base wall marking member situated in said main base slot and slidably movable therein;
    a main base locking assembly operatively connected to said main base wall marking member that selectively secures and releases said main base wall marking member at a position in said main base slot;
    wherein said first auxiliary base defines a linear slot extending substantially between said first auxiliary base first and second ends;
    a first auxiliary base wall marking member situated in said first auxiliary base slot and slidably movable therein; and
    a first auxiliary base locking assembly operatively connected to said first auxiliary base wall marking member that selectively secures and releases said first auxiliary base wall marking member at a selected position in said first auxiliary base slot.

2. The device as in claim 1 further comprising:
    a second auxiliary base having first and second ends and defining a generally planar configuration, said second auxiliary base being coupled to said main base opposite said first auxiliary base and movable relative thereto between a closed configuration in which said second auxiliary base is positioned substantially atop said main base and an open configuration in which said first auxiliary base is linearly adjacent said main base;
    a linear slot defined by said second auxiliary base that extends substantially between said second auxiliary base first and second ends;
    a second auxiliary base wall marking member situated in said second auxiliary base slot and slidably movable therein; and
    a second auxiliary base locking assembly operatively connected to said second auxiliary base wall marking member that selectively secures and releases said second auxiliary base wall marking member at a selected position in said second auxiliary base slot.

3. The device as in claim 2, further comprising:
    at least one bubble level positioned on said main base;
    at least one bubble level positioned on said first auxiliary base; and
    at least one bubble level positioned on said second auxiliary base.

4. The device as in claim 2, wherein said second auxiliary base is pivotally coupled to said main base with a second hinge, said second hinge being larger than said first hinge so that said second auxiliary base is movable to a closed position substantially atop said first auxiliary base when said first auxiliary base is atop said main base.

5. The device as in claim 2, wherein:
    said main base includes opposed rails extending longitudinally between said main base first and second ends;
    said first auxiliary base includes truncated side walls having a configuration that is complementary to a configuration of said rails so as to be received in said main base rails and slidably movable therealong; and
    said second auxiliary base includes truncated side walls having a configuration that is complementary to a configuration of said rails so as to be received in said main base rails and slidably movable therealong.

6. The device as in claim 1, wherein each of said base marking member and said first auxiliary base is an awl having proximal and distal ends, said distal ends each having a pointed configuration so as to mark a wall surface when pressure is applied to said proximal end.

7. The device as in claim 1, wherein:
    said base marking member includes a threaded configuration;
    said base locking assembly is a fastener having a threaded interior surface sized to receive said base marking member therein in an increasingly tightening relationship;
    said first auxiliary base marking member distal end includes a threaded configuration;
    said first auxiliary base locking assembly is a fastener having a threaded interior surface sized to receive said first auxiliary base marking member distal end therein in an increasingly tightening relationship.

8. The device as in claim 1, further comprising at least one bubble level situated on said main base.

9. The device as in claim 8, further comprising at least one bubble level situated on said first auxiliary base.

10. The device as in claim 1, wherein said first auxiliary base is pivotally coupled to said main base with a first hinge.

11. The device as in claim 10, further comprising scale indicia on said main base positioned adjacent said main base slot.

12. The device as in claim 1, wherein said first auxiliary base is slidably coupled to said main base.

13. The device as in claim 12, wherein:
    said main base includes opposed rails extending longitudinally between said main base first and second ends; and
    said first auxiliary base includes truncated side walls having a configuration that is complementary to a configuration of said rails so as to be received in said main base rails and slidably movable therealong.

14. The device as in claim 13, further comprising scale indicia on said main base positioned adjacent said main base slot.

15. A device for preparing a wall surface for mounting a wall fixture thereon, comprising:
    a main base having opposed first and second ends and defining a generally planar configuration, said main base defining a linear slot extending substantially between said main base first and second ends;

a main base wall marking member situated in said main base slot and slidably movable therein;

a main base locking assembly operatively connected to said main base wall marking member that selectively secures and releases said main base wall marking member at a position in said main base slot;

a first auxiliary base having first and second ends and defining a generally planar configuration, said first auxiliary base being coupled to said main base and movable relative thereto between a closed configuration in which said first auxiliary base is positioned substantially atop said main base and an open configuration in which said first auxiliary base is linearly adjacent said main base;

wherein said first auxiliary base defines a linear slot extending substantially between said first auxiliary base first and second ends;

a first auxiliary base wall marking member situated in said first auxiliary base slot and slidably movable therein; and a first auxiliary base locking assembly operatively connected to said first auxiliary base wall marking member that selectively secures and releases said first auxiliary base wall marking member at a selected position in said first auxiliary base slot.

16. The device as in claim 15, wherein each of said base marking member and said first auxiliary base is an awl having proximal and distal ends, said distal ends each having a pointed configuration so as to mark a wall surface when pressure is applied to said proximal end.

17. The device as in claim 16, wherein said base marking member distal end includes a threaded configuration;

said base locking assembly is a fastener having a threaded interior surface sized to receive said base marking member distal end therein in an increasingly tightening relationship;

said first auxiliary base marking member distal end includes a threaded configuration; and said first auxiliary base locking assembly is a fastener having a threaded interior surface sized to receive said first auxiliary base marking member distal end therein in an increasingly tightening relationship.

18. The device as in claim 17, further comprising:

at least one bubble level positioned on said main base;

at least one bubble level positioned on said first auxiliary base; and at least one bubble level positioned on said second auxiliary base.

19. The device as in claim 18, further comprising:

scale indicia on said main base positioned adjacent said main base slot; and scale indicia on said first auxiliary base position adjacent said first auxiliary base slot.

20. A device for preparing a wall surface for mounting a wall fixture thereon, comprising:

a main base having opposed first and second ends and defining a generally planar configuration;

a first auxiliary base having first and second ends and defining a generally planar configuration, said first auxiliary base being slidably coupled to said main base and movable relative thereto between a closed configuration in which said first auxiliary base is positioned substantially atop said main base and an open configuration in which said first auxiliary base is linearly adjacent said main base;

wherein said main base defines a linear slot extending substantially between said main base first and second ends;

a main base wall marking member situated in said main base slot and slidably movable therein;

a main base locking assembly operatively connected to said main base wall marking member that selectively secures and releases said main base wall marking member at a position in said main base slot;

wherein:

said main base includes opposed rails extending longitudinally between said main base first and second ends; and said first auxiliary base includes truncated side walls having a configuration that is complementary to a configuration of said rails so as to be received in said main base rails and slidably movable therealong.

* * * * *